United States Patent [19]
Michel et al.

[11] Patent Number: 5,079,418
[45] Date of Patent: Jan. 7, 1992

[54] POSITION MEASURING APPARATUS WITH REFLECTION

[75] Inventors: Dieter Michel; Erwin Spanner, both of Traunstein, Fed. Rep. of Germany

[73] Assignee: Dr. Johannes Heidenhain GmbH, Traunreut, Fed. Rep. of Germany

[21] Appl. No.: 482,287

[22] Filed: Feb. 20, 1990

[51] Int. Cl.$^5$ .................... H01J 3/14; G01D 5/34
[52] U.S. Cl. .................... 250/237 G; 250/231.14; 250/231.16
[58] Field of Search .......... 250/237 G, 231.16, 231.14

[56] References Cited

U.S. PATENT DOCUMENTS

| | | | |
|---|---|---|---|
| 4,792,678 | 12/1988 | Spies | 250/231 |
| 4,794,251 | 12/1988 | Scholian | 250/237 G |

FOREIGN PATENT DOCUMENTS

| | | |
|---|---|---|
| 3700906A1 | 7/1987 | Fed. Rep. of Germany . |
| 3633574A1 | 4/1988 | Fed. Rep. of Germany . |
| 2185314A | 7/1990 | United Kingdom . |

OTHER PUBLICATIONS

Dreigitter schrittgeber, published 1978.

Primary Examiner—David C. Nelms
Assistant Examiner—LaCharles P. Keesee

[57] ABSTRACT

A position measuring apparatus for measuring the position of a first object relatively movable with respect to a second object. The position measuring apparatus includes a first deflection element, a light source positioned to scan the first deflection element with a light beam, a second deflection element, and a reflection element. The second deflection element and the reflection element are adapted with respect to each other and with respect to the first deflection element so that partial beam bundles deflected from the first deflection element are deflected by the second deflection element and emerge converging from the second deflection element into the reflection element, are reflected by the reflection element, and emerge diverging from the reflection element, impinge again on a deflection element, are deflected again and are brought into interference. The movement of the first object connected to the first deflection element with respect to the second object connected to the second deflection element can be determined by detection of the interference.

19 Claims, 11 Drawing Sheets

POSITION MEASURING APPARATUS WITH REFLECTION

BACKGROUND OF THE INVENTION

The invention relates to a photoelectric position measuring apparatus and in particular to a position measuring apparatus that utilizes interference by partial light beam bundles of separate orders of diffraction.

A prior position measuring apparatus is disclosed in U.S. Pat. No. 4,792,678 which is hereby incorporated herein by reference. One of the embodiments of the '678 patent shows two linear divisions for the deflection of the positive and negative diffraction beams (e.g., FIG. 3 of the '678 patent). Measuring signals are obtained from interferences of the positive and negative diffraction beams of one order (e.g., +1, −1).

The dissertation "Dreigitterschrittgeber" by J. Willhelm, 1978, Technische Universitat Hannover, page 52, describes a "four-grid generator." As described, this device has high sensitivity with reference to the grid constant. The device described in that publication includes a 120° prism that serves for the reflection of partial beam bundles. The publication also states that it is advantageous that entry and exit beam areas are separate, so that inner reflections do not have an interfering effect. However, with such arrangement the Moire sensitivity can be disadvantageous. Interferences can arise which are due to the sensitivity of the position measuring apparatus due to turnings of the grids to one another.

Accordingly, it is an object of the present invention to provide a high-resolution, relatively simply constructed position measuring apparatus in which the evaluation of interfering beam bundles leads to phase-shifted signals with a high degree of modulation.

It is a further object of the present invention to provide a position measuring apparatus which is insensitive to turnings or tiltings of grids to one another.

SUMMARY OF THE INVENTION

To achieve the foregoing and other objectives and in accordance with the purposes of the present invention, there is provided a position measuring apparatus for measuring the position of a first object relatively movable with respect to a second object. The position measuring apparatus comprises a first deflection means, a light source positioned to scan the first deflection means with a light beam, a second deflection means, and a reflection element. The second deflection means and the reflection element are positioned with respect to each other and with respect to the first deflection means so that deflected partial beam bundles from the first deflection means are deflected by the second deflection means and emerge converging from the second deflection means into the reflection element, are reflected by the reflection element, and emerge diverging from the reflection element, impinge again on a deflection means, are deflected again and brought into interference, whereby the movement of the first object connected to the first deflection means with respect to the second object connected to the second deflection means can be determined by detection of the interference.

BRIEF DESCRIPTION OF THE DRAWINGS

FIG. 1b is a variation of the embodiment depicted in FIG. 1a.

FIG. 7b is plan view of FIG. 7a.

FIG. 8b is a plan view of FIG. 8a.

DETAILED DESCRIPTION OF THE PRESENTLY PREFERRED EMBODIMENTS

Figure 1A:
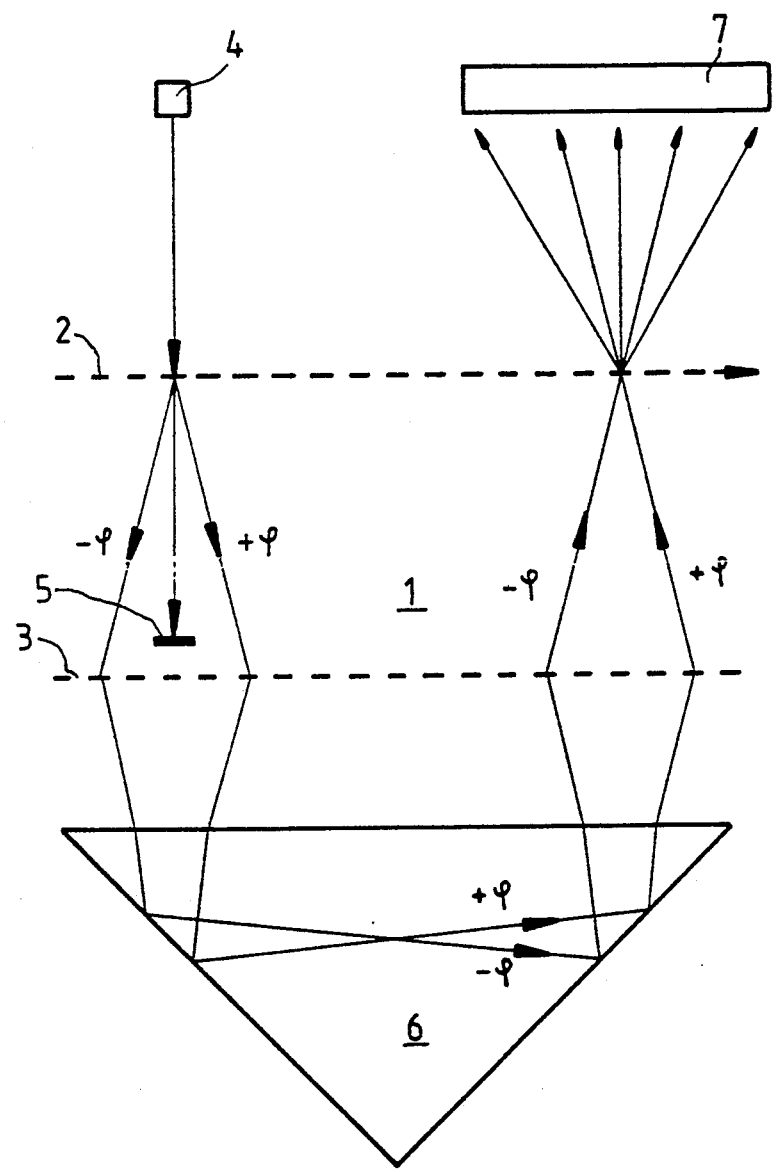
FIG. 1a is a schematic representation of first preferred embodiment of the position measuring apparatus.

FIG. 1a is a schematic of a first preferred embodiment of the position measuring apparatus of the present invention.

The present invention measures the position of a first object relatively movable with respect to a second object. The first object (not shown) is connected to a first deflection means 2. The first deflection means 2 may be a phase grid. The first object moves with the first deflection means 2 parallel to the second object (likewise not shown). Movement of the first deflection means 2 is indicated by the arrow on the right end of first deflection means 2. The second object is connected to a second deflection means 3.

A scanning unit that includes a light source 4, preferably a laser, is positioned to scan the first deflection means 2 with a light beam. The light beam emitted from the light source 4 is deflected by the first deflection means 2. The light beam may be diffracted as well by the first deflection means 2 into partial beam bundles of separate orders of diffraction. The zero order of diffraction is screened out by a blind 5. Partial beam bundles −φ and +φ deflected by the first deflection means 2 impinge upon the second deflection means 3 and are again deflected.

On the outlet side of the second deflection means 3 there is positioned a reflection element 6. Such elements are known in the art and for this embodiment a triple mirror is used. The second deflection means 3 and the reflection element 6 are constructed, adapted and positioned with respect to one another so that the partial beam bundles −φ and +φ intersect in a single point.

After emerging from the reflection element 6, the partial beam bundles −φ and +φ impinge on a deflection means. This deflection means may form a single unit with the second deflection means, but the invention is not necessarily so limited. In FIG. 1a, the second deflection means 3 is depicted as coextensive with both the area in which partial beam bundles are deflected to the reflection element 6 as well as the area in which the partial beam bundles are received from the reflection element 6.

The partial beams are deflected by the second diffraction element 3 and impinge again upon the first deflection means 2, where they are brought into interference and are again deflected. The interfering and deflected partial beam bundles are measured by a detector 7. The detector 7 transforms these into measuring signals that are phase-displaced to one another.

Figure 1B:
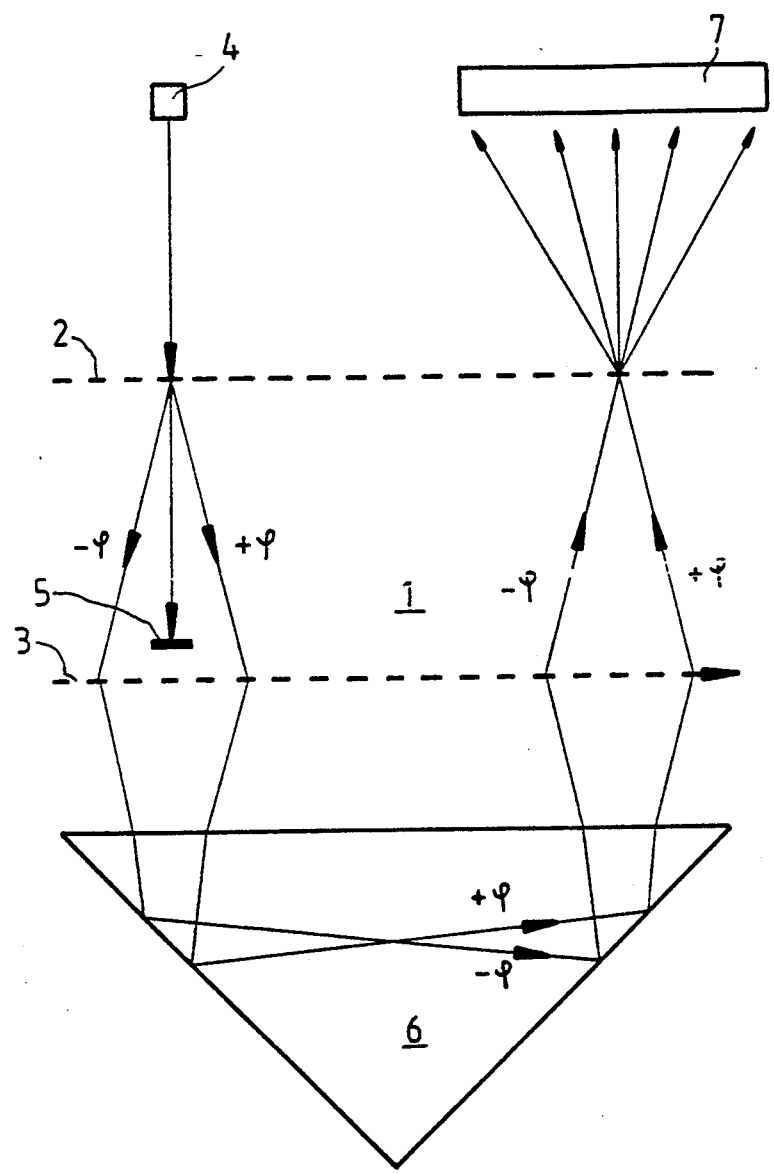

Referring to FIG. 1b, this is a variation of the embodiment described above in FIG. 1a. In this variation, it is not the first deflection means 2 that is moved but the second deflection means 3 that is moved. This is indicated by the arrow on the right end of the second deflection means 3. As evident by comparison of the variations depicted in FIGS. 1a and 1b, for purposes of this invention it is immaterial which of the two deflection means is moved.

Figure 2:
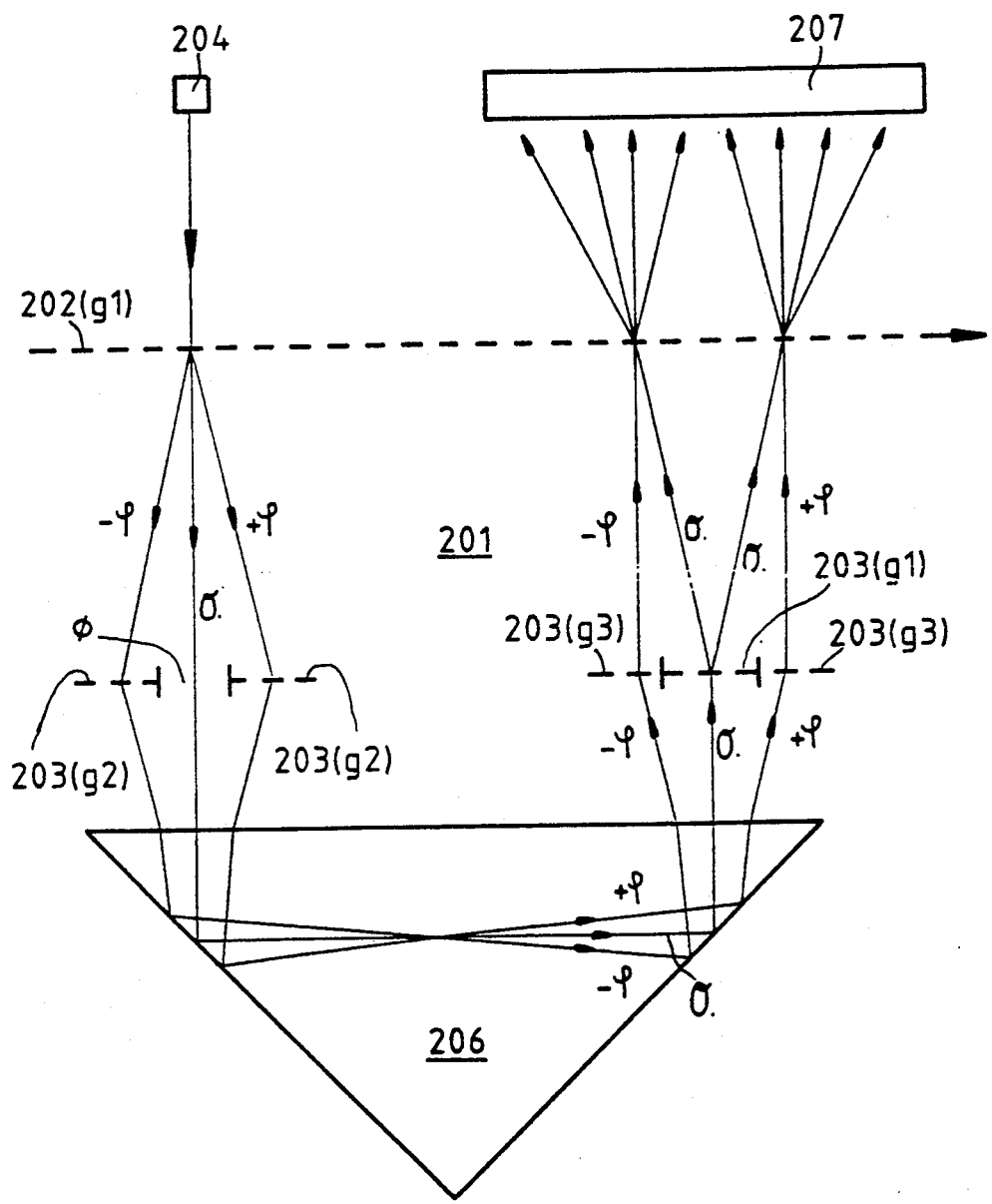
FIG. 2 is a schematic representation of a second preferred embodiment.

In FIG. 2 there is depicted another embodiment 201 of the position measuring apparatus of the present invention. In this embodiment, a light beam emitted from a light source 204, which may be a laser, is deflected by a first deflection means 202, which may be a grid having a grid constant g1. A second deflection means 203 is arranged with a reflection element 206. In this embodiment, the reflection element 206 may be triple prism. The second deflection means 203 has a grid constant g2 in the zones in which partial beam bundles $-\phi$ and $+\phi$ deflected by the first deflection means 202 impinge. The grid constant g2 differs from the grid constant g1 of the first deflection means 202. In the zone in which the zero diffraction order impinges upon the second deflection means 203, there is provided a optically neutral zone $\phi$. This optically neutral zone may be a recess in the second deflection means 203. The partial beam bundles $-\phi$, 0., and $+\phi$ are reflected in the reflection element 206 so that they intersect again in a point. The partial beam bundles emerging from the reflection element 206 again pass through a deflection means, in this embodiment the second deflection means 203, by which they are again deflected. The zone in which the partial beam bundle of zero order of diffraction passes through the second deflection means 203 has a grid constant g1 that is identical with the grid constant g1 of the first deflection means 202. This zone is designated 203(g1).

The zones of the second deflection means 203 through which the partial beam bundles $-\phi$ and $+\phi$ pass have a grid constant g3 which differs from the grid constants g1 and g2. These zones are designated as 203(g3). The partial beam bundles $-\phi$, 0. and $+\phi$ are deflected again by the second deflection means 203. These partial beam bundles are again deflected by the first deflection means 202, interfere and impinge upon a detector 207, by which they are transformed into measuring signals phase-displaced to one another.

Figure 3:
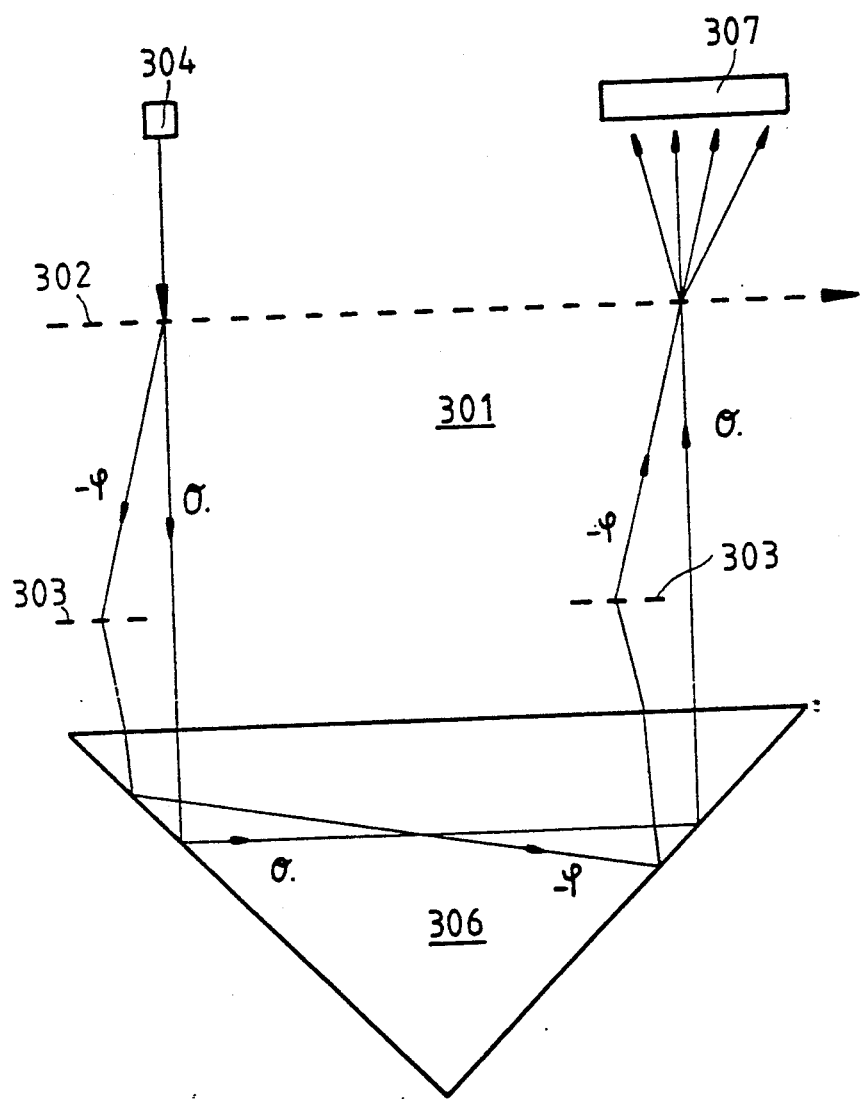
FIG. 3 is a schematic representation of a third preferred embodiment.

Another embodiment is shown in FIG. 3. A beam of light from a light source 304 is deflected by a first deflection means 302 into partial beam bundles $-\phi$ and 0.. A second deflection means 303 deflects the partial beam bundles $-\phi$ and 0. into a reflection element 306 where these bundles again intersect in a single point as in the previous embodiments. After emerging from the reflection element 306, the partial beam bundles $-\phi$ and 0. pass through a deflection means, e.g. the second deflection means 303. The partial beam bundles are again deflected and fall parallel to their incidence direction upon the first deflection means 302, where they are brought into interference. These interfering partial beam bundles are measured by a detector 307 and converted into measuring signals again which are phase-displaced to one another.

Figure 4:
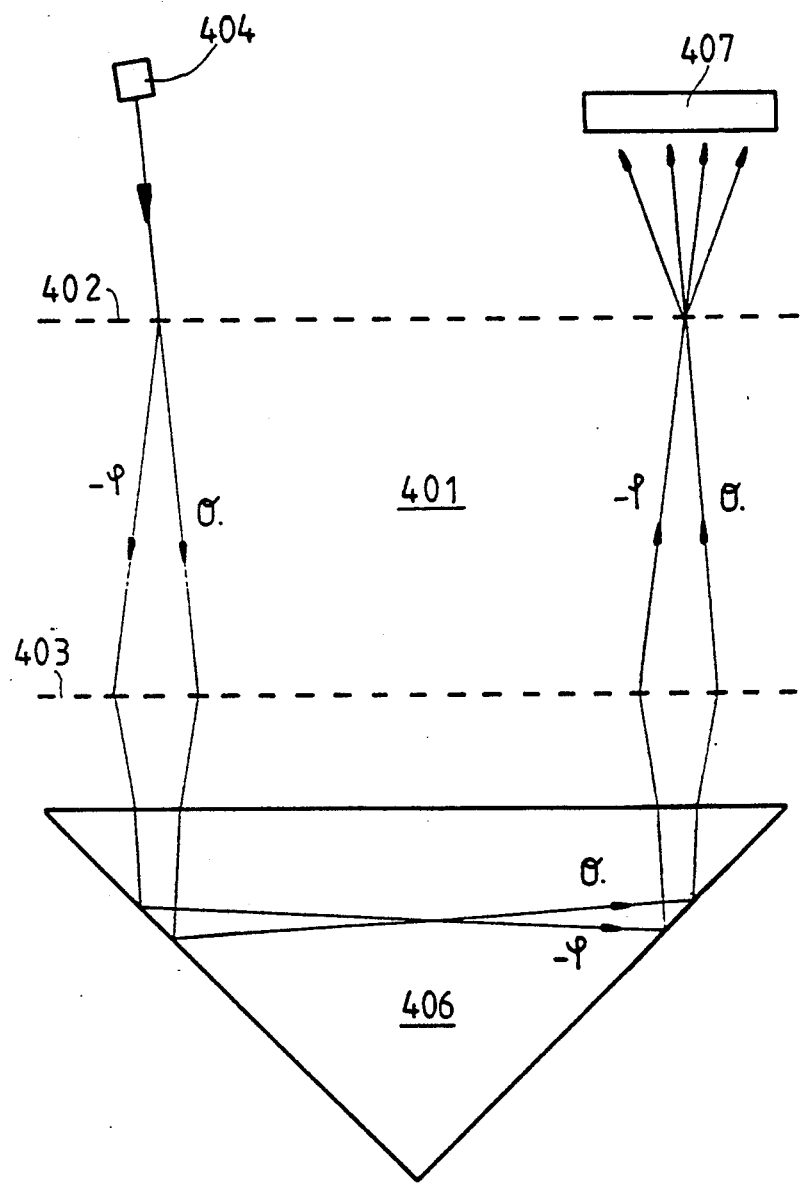
FIG. 4 is a schematic representation of a fourth preferred embodiment.

In the embodiment shown in FIG. 4, the angle of incidence of the light directed by a light source 404 onto a first deflection means 402 deviates from the normal. This embodiment provides a symmetrical course for the partial beam bundles $-\phi$ and 0., which can be advantageous for measuring. Otherwise, this embodiment corresponds to the previous embodiment depicted in FIG. 3.

Figure 5:
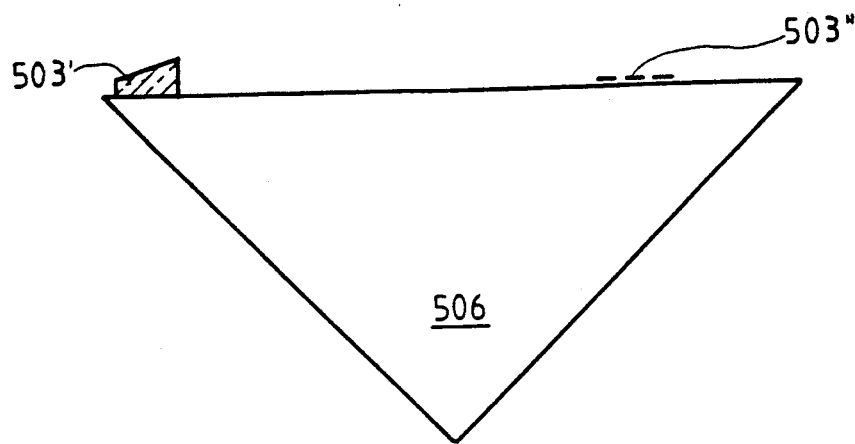
FIG. 5 is a schematic representation of an embodiment of a reflection component usable with the embodiments of the position measuring apparatus.

FIG. 5 is a schematic representation of an embodiment of a reflection component that can be utilized with any of the embodiments of the position measuring apparatus of the present invention. A reflection element is combined with at least one deflection means to form a reflection component 506. The reflection component 506 fully or partially combines the reflection element and at least one deflection means. The one deflection means may be a prism 503' or a grid 503'' or a combination thereof. The deflection means so combined is constructed, positioned and adapted to provide (1) the function of the second deflection means to deflect partial beam bundles into the reflection element from a first deflection means (e.g. 503'), (2) the function of a deflection means to deflect partial beam bundles from the reflection element into the first deflection means (e.g. 503''), or (3) both of these functions. In practice, a position measuring apparatus with such a component has the advantage that a deflection means can be mounted on the entry and/or exit surfaces of a reflection element to form a reflection component and this component then can be kept in stock as a standard component.

Figure 6A:
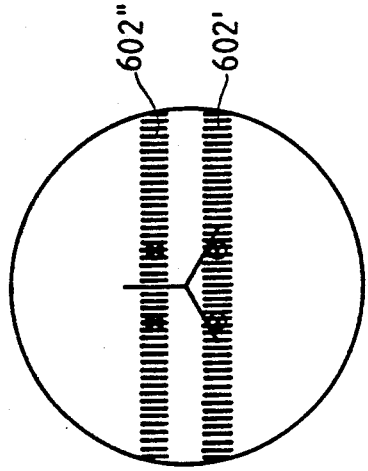
FIGS. 6a and 6b contrast two variations of execution implementable with the preferred embodiments.
Figure 6A:
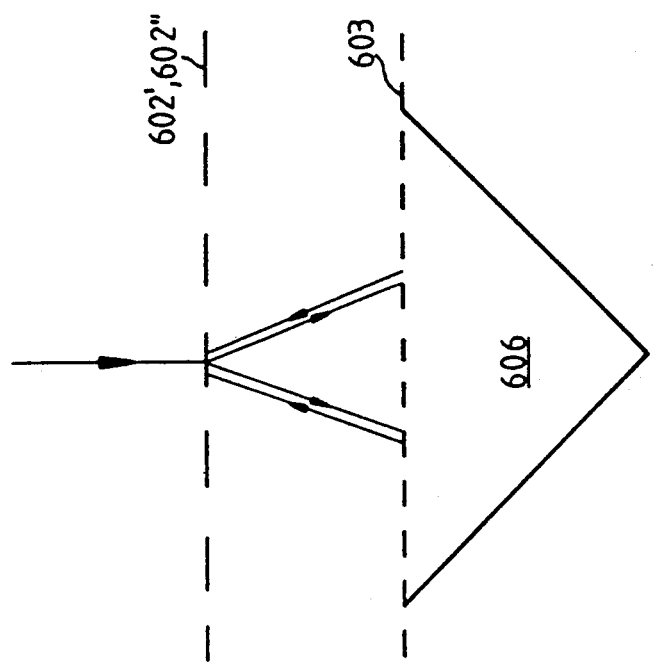
Figure 6B:
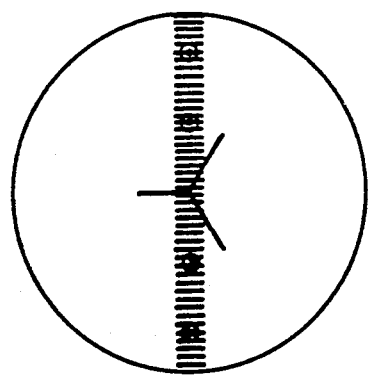
Figure 6B:
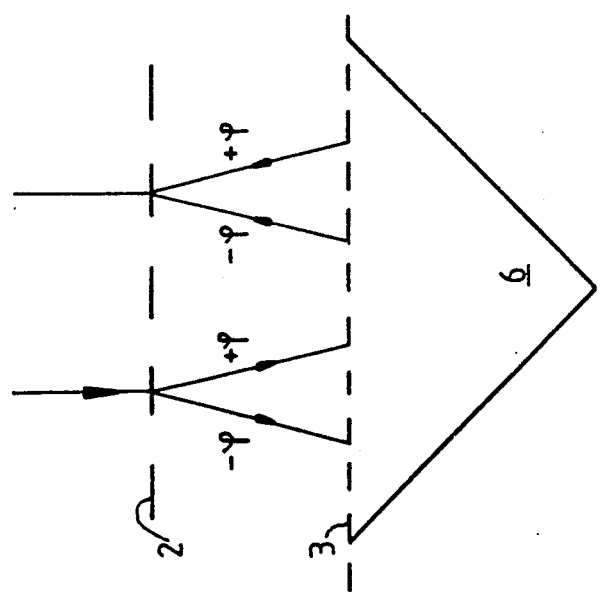

In the embodiments so far discussed, the entry and exit fields of the beam bundles lie in succession in the direction of measurement. The present invention can also include embodiments in which the entry and exit fields are arranged adjacently in the measuring direction. In FIGS. 6a and 6b, these two arrangements are compared and contrasted. FIG. 6a shows the arrangement for the embodiments already explained, in which the entry and exit fields are arranged in succession in the direction of measurement. This corresponds analogously to the embodiment of FIG. 1.

FIG. 6b shows an arrangement in which the entry and exit areas of the reflection element lie parallel adjacently to one another. For this arrangement, it is required either that the first deflection means is broad enough to accomodate both entry and exit beams adjacently, or else two parallel deflection means (602', 602'') may be used. Since the two deflection means (602', 602'') can be moved relatively to one another or with one another, a sum or difference measurement can be performed. The insensitivity to twistings and/or tiltings is preserved.

In addition to the embodiments of the measuring apparatus so far described which use transmitted-light, the present invention can also be used as a directlight apparatus and also as an angle measuring apparatus.

Figure 7A:
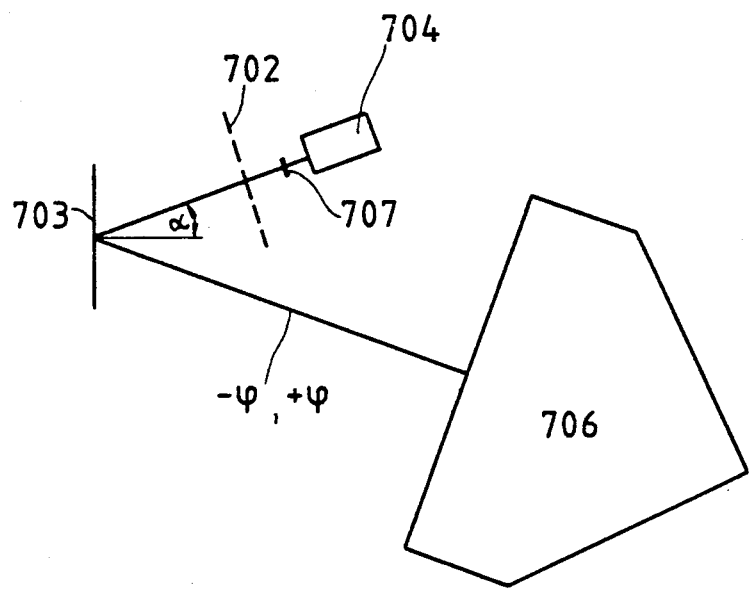
FIG. 7a is a schematic representation of a sixth preferred embodiment.
Figure 7B:
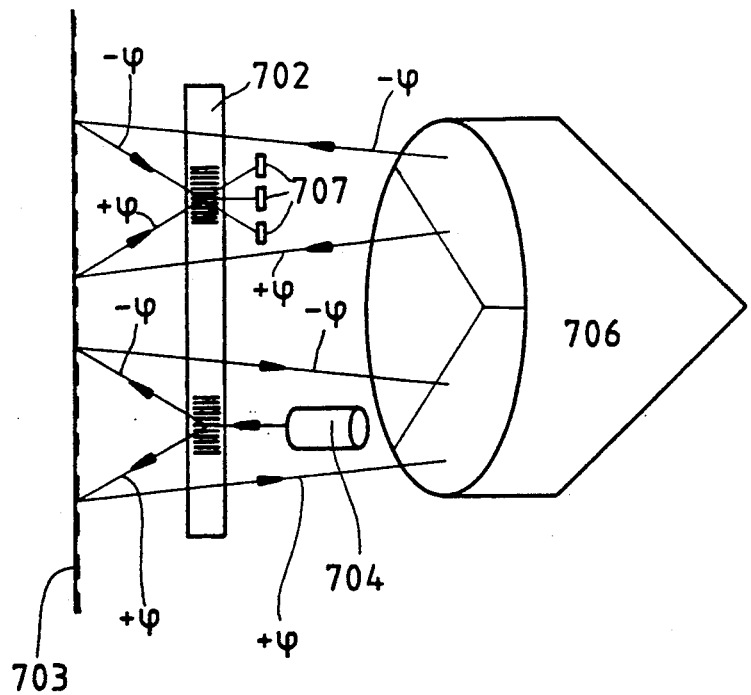

Referring to FIGS. 7a and 7b, a light source 704 such as a laser, illuminates a deflection element 703 at an angle α. The deflection-reflection element 703 deflects partial beam bundles $+\phi$ and $-\phi$ into a reflection element 706 which may be a triple prism. As shown in FIG. 7b, this embodiment (using direct-light) is analogous in its construction to the transmitted-light embodiment of FIG. 1b. A light beam from the light source 704 impinges upon a first deflection means 702 which may be a grid which splits the light beam into partial beam bundles +φ and −φ. These partial beam bundles +φ and −φ are reflected and deflected by the deflection-reflection element 703 into the reflection element 706. In this embodiment, deflection-reflection element 703 is analogous to the second deflection element 3 of the transmitted TM light version. The partial beam bundles are deflected into the reflection element 706 with converging beam courses. The partial beam bundles pass through the reflection element 706 and emerge again with divergent beam courses. The partial beam bundles then impinge again upon the deflection-reflection element 703. These partial beam bundles are again deflected and combine on the first deflection means 702. There the partial beam bundles interfere and are detected by a detector 707.

Figure 8A:
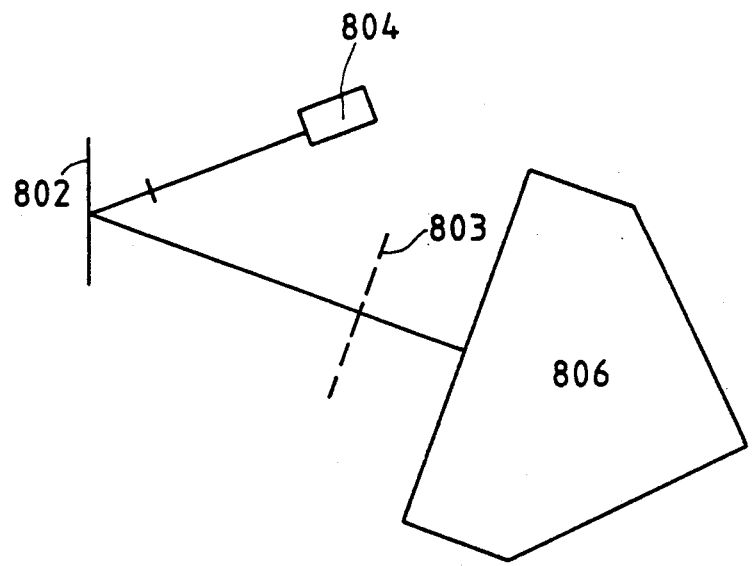
FIG. 8a is a schematic representation of a seventh preferred embodiment.
Figure 8B:
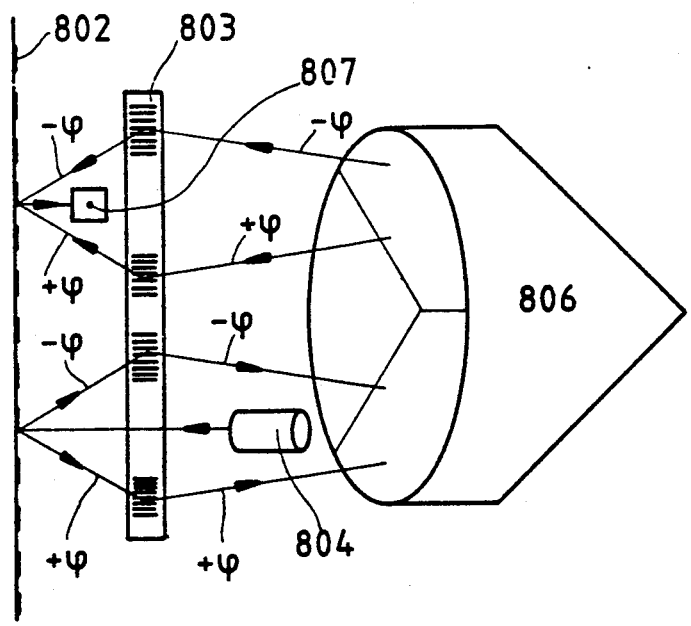

The incident-light embodiment depicted in FIGS. 8a and 8b corresponds analogously to the transmitted-light embodiment depicted in FIG. 1a. Referring to FIGS. 8a and 8b, a light source 804, which may be a laser, emits a light beam that impinges upon a first deflection-reflection element 802. The beam is diffracted into partial beam bundles +φ and −φ which are deflected onto a second deflection means 803. These partial beam bundles are again deflected and enter, converging, into a reflection element 806. The reflection element 806 may be a triple prism. The partial beam bundles pass through the reflection element 806 as in the above-described manner. After emerging from the reflection element 806, the partial beam bundles impinge, diverging, upon the second deflection means 803, are again deflected, and impinge upon the first deflection-reflection element 802. The partial beam bundles are combined to bring them into interference. The interfering partial beam bundles are deflected onto detectors 807 that measure the interfering signals. In contrast to the embodiment shown in FIGS. 7a and 7b, the light beam is both deflected and reflected first by deflection-reflection element 802. As shown in FIGS. 7a and 7b, the light beam is deflected and reflected by deflection-reflection element 703 after it is first deflected by the first deflection means 702.

FIGS. 9a-9h depict a series of embodiments. For sake of clarity and brevity, the light sources and the detectors are not represented. Also, only differing aspects will be described. All the embodiments depicted in FIGS. 9a-9h have in common that the illumination direction is not perpendicular to the deflection means.

Figure 9A:
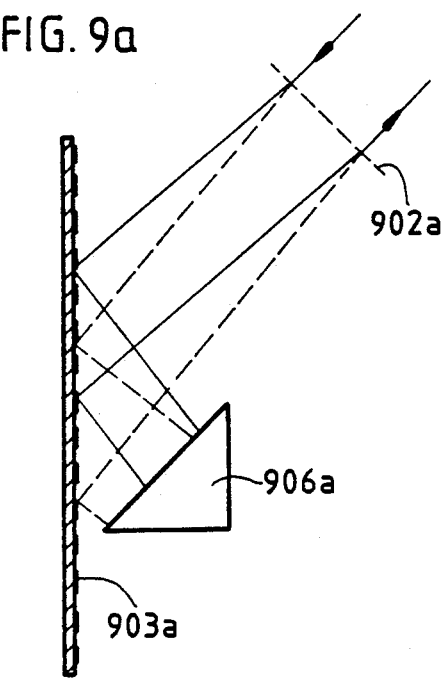
FIGS. 9a to 9h are schematic representations of additional preferred embodiments.

In the embodiment of FIG. 9a, a deflection means 902a and the base of a reflection element 906a, which may be a triple prism, form an angle to the plane of a deflection-reflection element 903a and likewise to one another.

Figure 9B:
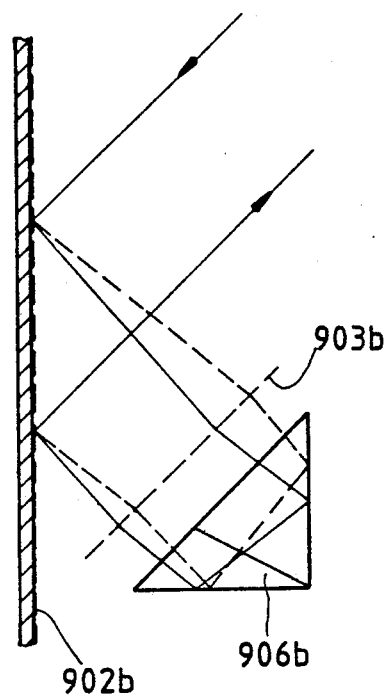

According to FIG. 9b, a deflection means 903b and the base of a reflection element 906b, which may be a triple prism, lie parallel adjacent to one another, but form an angle to the plane of a element 902b.

Figure 9C:
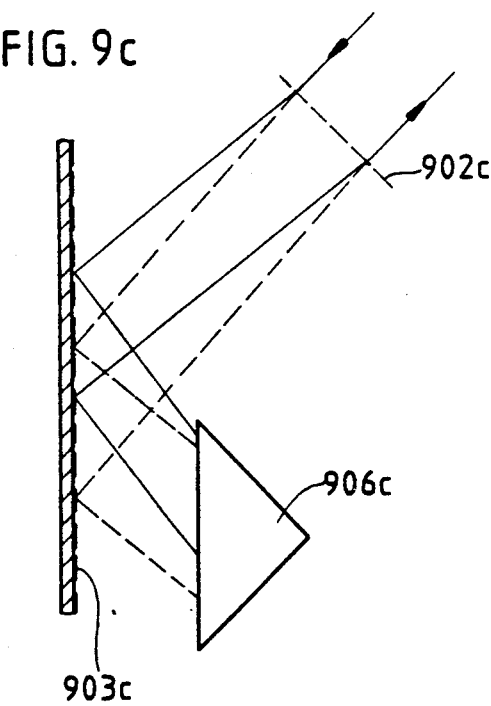

According to FIG. 9c, a deflection means, 902c forms an angle to the plane of a deflectionreflection element 903c and to the base of a reflection element 906c, which may be a triple prism, the latter running parallel to one another. The deflection means 902c lies between the light source (not represented) and the deflection-reflection element 903c.

Figure 9D:
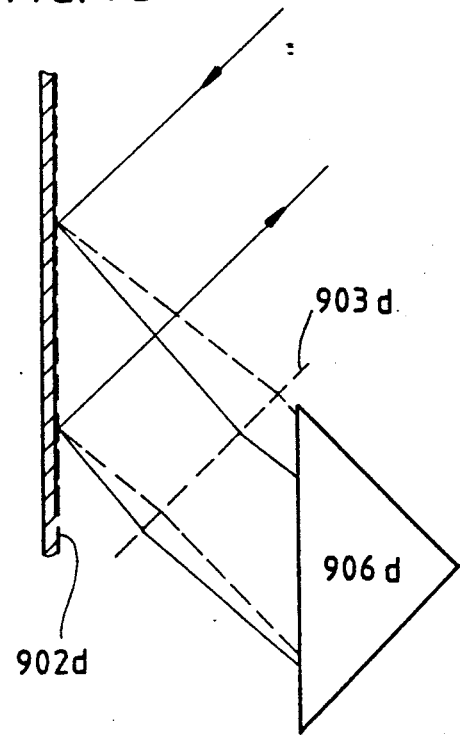

The embodiment depicted in FIG. 9d differs from that of FIG. 9c in that a deflection means 903d lies between the plane of a deflectionreflection element 902d and the base parallel thereto of a reflection element 906d, which may be a triple prism, and forms an angle to them.

Figure 9E:
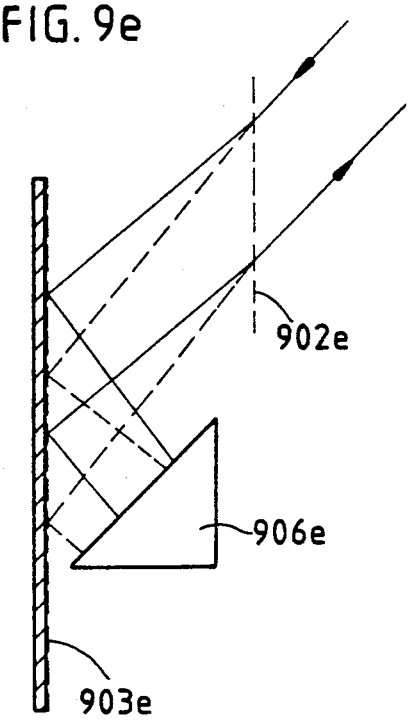

In FIG. 9e, there is shown an embodiment in which a deflection means 902e lies between an light source (not shown) and a deflection-reflection element 903e and runs parallel to its plane. The base of a reflection element 906e, which may be a triple prism, forms an angle to both.

Figure 9F:
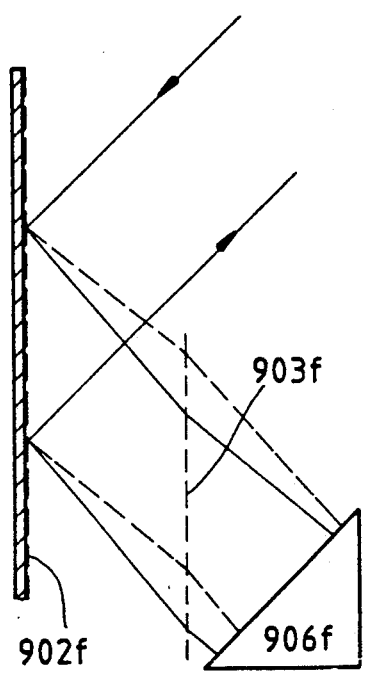

The embodiment depicted in FIG. 9f is similar to the embodiment of FIG. 9e. Here, however, a deflection means 903f is between the base of a reflection element 906f, which may be a triple prism, and a deflection-reflection element 902f.

Figure 9G:
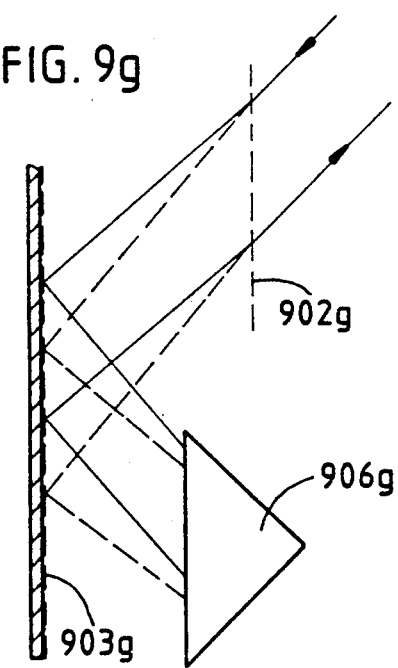

FIG. 9g shows an embodiment in which a deflection means 902g is between a light source (not represented) and a deflection-reflection element 903g. The plane of the deflection-reflection element 903g as well as the deflection means 902g and the base of a reflection element 906g, which may be a triple prism, lie parallel to one another.

Figure 9H:
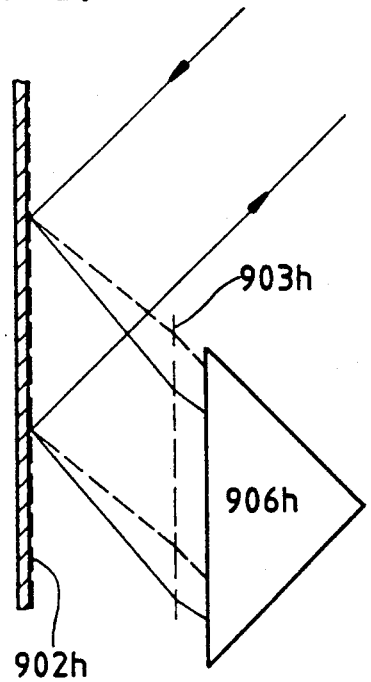

In the embodiment shown in FIG. 9h, a deflection means 903h lies in the beam path between the plane of a deflection-reflection element 902h and the base of a reflection element 906h, which may be a triple prism, and parallel to these.

Figure 10A:
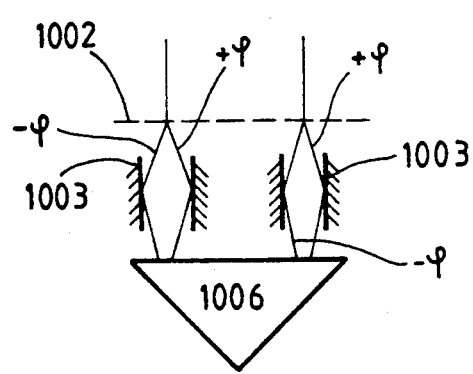
FIGS. 10a and 10b are schematic representations of additional preferred embodiments.
Figure 10B:
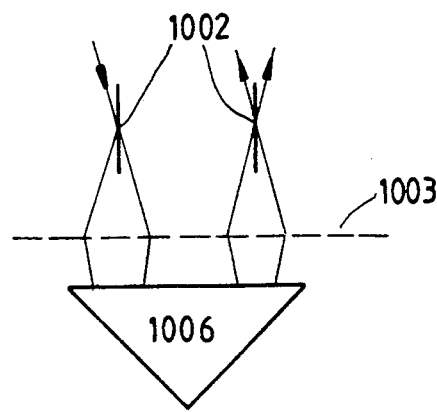

FIGS. 10a and 10b show that for the deflection of the partial beam bundles +φ and −φ, not only grids may be used, but mirrors or prisms can also be used. FIG. 10a shows the utilization of mirrors 1003 for the deflection of partial beam bundles. Further, referring to FIG. 10b, deflection can be accomplished by partially permeable mirrors 1002, or the like. The use of prisms may also be used either independently or in a component with the reflection element (see FIG. 5, element 503′).

It is intended that the foregoing detailed description be regarded as illustrative rather than limiting, and that it be understood that it is the following claims, including all equivalents, which are intended to define the scope of the invention.

We claim:

1. A position measuring apparatus for measuring the position of a first object relatively movable with respect to a second object comprising:
 a first deflection means,
 a light source positioned to scan said first deflection means with a light beam,
 a second deflection means, and
 a reflection element, said second deflection means and said reflection element positioned with respect to each other and with respect to said first deflection means so that deflected partial beam bundles from said first deflection means are deflected by said second deflection means and emerge converging from said second deflection means into said reflection element, are reflected by said reflection element, and emerge diverging from said reflection element, impinge again on a deflection means, are deflected again and are brought into interference, whereby the movement of the first object connected to said first deflection means with respect to the second object connected to said second deflection means can be determined by detection of the interference.

2. The position measuring apparatus of claim 1 in which said second deflection means and said reflection element are positioned with respect to each other and with respect to said first deflection means so that each partial beam bundle exiting from said reflection element is parallel to its own path of entry into said reflection element, and further that the spacing between the points at which each partial beam bundle enters and exits said reflection element is equal.

3. The position measuring apparatus of claim 1 in which said second deflection means and said reflection element are positioned with respect to each other and with respect to the said first deflection means so that partial beam bundles enter and exit said reflection element is succession in the direction of measurement.

4. The position measuring apparatus of claim 3 in which said second deflection means and said reflection element are adapted with respect to each other so that partial beam bundles deflected from said second deflection means into said reflection element intersect in a single point.

5. The position measuring apparatus of claim 1 in which said second deflection means and said reflection element are adapted with respect to each other and with respect to said first deflection means so that partial beam bundles enter and exit said reflection element adjacent to each other in the direction of measurement.

6. The position measuring apparatus of claim 5 in which said first deflection means comprises a first diffraction grid adapted to diffract a light beam from said light source and a second diffraction grid parallel to said first diffraction grid and positioned with respect to said second deflection means so that partial beam bundles exiting from said second deflection means combine and are brought into interference on said second diffraction grid.

7. The position measuring apparatus of claim 6 in which said first diffraction grid and said second diffraction grid are movable relatively to each other in the direction of measurement.

8. The position measuring apparatus of claim 1 in which said reflecting element further includes at least one deflection means to form reflection component.

9. The position measuring apparatus of claim 8 in which said at least one deflection means is a grid.

10. The position measuring apparatus of claim 8 in which said at least one deflection means is a prism.

11. The position measuring apparatus of claim 1 in which said reflection element is a triple mirror.

12. The position measuring apparatus of claim 1 in which said reflection element is a triple prism.

13. The position measuring apparatus of claim 1 in which said second deflection means and said reflection element are fixed in position.

14. The position measuring apparatus of claim 1 in which said second deflection means is movable and said reflection element is fixed in position.

15. The position measuring apparatus of claim 1 in which the direction of illumination from said light source is at an angle to the direction which is perpendicular to the normal and the line direction of said first or second deflection means or said reflection element.

16. The position measuring apparatus of claim 1 in which said first deflection means comprises a grid.

17. The position measuring apparatus of claim 1 in which said first deflection means comprises a partial permeable diffracting mirror.

18. The position measuring apparatus of claim 1 in which said second deflection means comprises a grid.

19. The position measuring apparatus of claim 1 in which said second deflection means comprises a partially permeable diffracting mirror.

* * * * *

UNITED STATES PATENT AND TRADEMARK OFFICE
CERTIFICATE OF CORRECTION

PATENT NO. : 5,079,418
DATED : January 7, 1992
INVENTOR(S) : Dieter Michel et al.

It is certified that error appears in the above-identified patent and that said Letters Patent is hereby corrected as shown below:

On title page, column 2, on the line following the name of the Assistant Examiner, please insert --Attorney, Agent, or Firm--Willian Brinks Olds Hofer Gilson & Lione--.

In column 4, line 48, please delete "accomodate" and substitute therefor --accommodate--.

In column 4, line 57, please delete "directlight" and substitute therefor --direct-light--.

In column 5, line 6, please delete "transmitted TM light" and substitute therefor --transmitted-light--.

In column 5, line 59, please delete "deflectionreflection" and substitute therefor --deflection-reflection--.

In column 5, line 67, please delete "deflectionreflection" and substitute therefor --deflection-reflection--.

UNITED STATES PATENT AND TRADEMARK OFFICE
CERTIFICATE OF CORRECTION

PATENT NO. : 5,079,418

DATED : January 7, 1992

INVENTOR(S) : Dieter Michel et al.

It is certified that error appears in the above-identified patent and that said Letters Patent is hereby corrected as shown below:

In column 6, line 4, before "light" please delete "an" and substitute therefor --a--.

Signed and Sealed this

Third Day of August, 1993

Attest:

MICHAEL K. KIRK

*Attesting Officer*   Acting Commissioner of Patents and Trademarks